No. 672,312. Patented Apr. 16, 1901.
H. COOK.
GLASS TUBE CUTTER.
(Application filed Sept. 11, 1900.)
(No Model.)
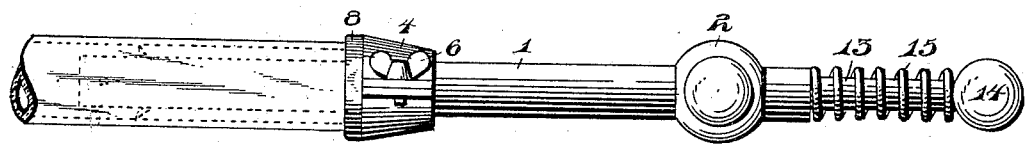
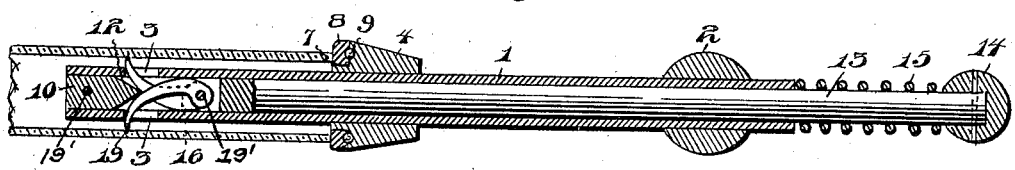
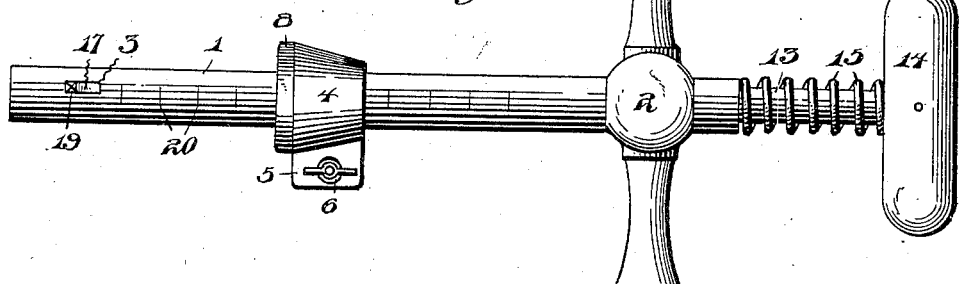
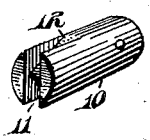
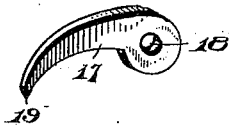
Witnesses:
J. P. Appleman,
E. E. Potter
Inventor.
Harry Cook.
By
Atty's

UNITED STATES PATENT OFFICE.

HARRY COOK, OF McKEESPORT, PENNSYLVANIA.

GLASS-TUBE CUTTER.

SPECIFICATION forming part of Letters Patent No. 672,312, dated April 16, 1901.

Application filed September 11, 1900. Serial No. 29,669. (No model.)

*To all whom it may concern:*

Be it known that I, HARRY COOK, a citizen of the United States of America, residing at McKeesport, in the county of Allegheny and State of Pennsylvania, have invented certain new and useful Improvements in Glass-Tube Cutters, of which the following is a specification, reference being had therein to the accompanying drawings.

This invention relates to certain new and useful improvements in glass-cutters, and more particularly to that class known as "glass-tube cutters."

The invention has for its one object the provision of novel means whereby glass tubes may be easily cut and accurately gaged to cut certain lengths as required.

The invention has for its further object to provide novel means that will engage and cut a tube from the interior walls of the same; furthermore, to provide certain novel means whereby the device may be revolved with the tube in the operation of cutting the same.

The invention has for its still further object to construct a device of the above-described character which will be extremely simple in its construction, strong, durable, inexpensive to manufacture, and highly efficient in its operation.

The invention finally consists in the novel combination and arrangement of parts to be hereinafter more fully described, and specifically pointed out in the claims.

In describing the invention in detail reference is had to the accompanying drawings, forming a part of this specification, and wherein like numerals of reference indicate corresponding parts throughout the several views, in which—

Figure 1 is a side elevation of my improved glass-tube cutter, showing the same inserted in a tube, partly broken away. Fig. 2 is a longitudinal vertical sectional view thereof. Fig. 3 is a top plan view of the cutter detached from the tube. Fig. 4 is a top plan view of the end of the operating-shaft carrying the cutter-fingers and showing the connection between the cutter-fingers and spreaders. Fig. 5 is an enlarged perspective view of the spreader. Fig. 6 is an enlarged perspective view of one of the cutter-fingers.

In the drawings the reference-numeral 1 indicates a tubular casing having rigidly secured thereto a handle 2 and having formed therein, near its opposite end, slots 3. A split cone-shaped collar 4, carrying lugs 5, is secured upon the casing 1, said lugs being apertured to receive a set-screw 6. The forward end of said collar is contracted, as shown at 7, and adapted to receive a sleeve 8, ball-bearings 9 being arranged between said sleeve and collar for the purpose of assuring an easy rotation of the sleeve upon the collar. Secured in the end of said casing is a spreader 10, said spreader being slotted centrally at one of its ends, as shown at 11, forming inclined sides 12.

The reference-numeral 13 represents an operating-shaft secured in the casing 1, said operating-shaft carrying at its free end a handle 14. A spiral spring 15 is adapted to encircle a portion of said operating-shaft and is arranged between the handle 14 and the end of the casing 1. The end of said shaft is bifurcated, as shown at 16, and is adapted to receive the cutter-fingers 17, the latter being apertured, as at 18, adapted to receive a pin 19', secured through the bifurcated end 16 of the shaft 13. These fingers are arranged opposite to one another and when forced into the operative position extend through the slots 3, the cutting-points 19 engaging the interior face of the tube, the spreader serving to force the said fingers outwardly against the tube as the shaft is pressed downwardly. The casing 1 is further provided with graduations 20, so as to gage the length of the glass to be cut from the tube. The end of the tube of glass is pressed against the sleeve, allowing the same to rotate with the operation of the tube, the spiral spring serving to retract the shaft, which carries with it the cutting-fingers and returning the same to their normal position in the casing 1. The cone-shaped collar, as will be readily understood, may be adjusted to any point upon the casing 1, the graduations serving to gage the length of the tube to be cut.

It will be noted that the above-described device may be easily handled. The hand of the operating-shaft 13 is placed in the palm of the hand and the handle 2 engages with the fingers. Then by forcing the shaft into the casing the cutting edges of the fingers will engage the interior of the glass, and then by rotating the tube the glass will be easily cut at the desired point.

It will be noted that various changes may be made in the details of construction without departing from the general spirit of my invention.

Having thus fully described my invention, what I claim as new, and desire to secure by Letters Patent, is—

1. In a device of the character described, the combination with a scaled tube or casing carrying a handle, a spreader in one end of the tube or casing, and a collar adjustably mounted on said tube or casing, said collar carrying a rotatable sleeve of a shaft arranged in said tube or casing with a handle on one end, a pair of cutters pivotally mounted in the end of the shaft within the tube or casing, said cutters crossing each other and extending outwardly through slots provided therefor in the tube or casing, and a retracting-spring arranged on the shaft between the end of the tube and casing and the handle carried by the shaft, substantially as described.

2. A cutter for cutting glass tubes into lengths comprising a tube or casing having a handle mounted thereon near one end, a spreader secured in the opposite end of the tube or casing, a collar adjustably mounted on said tube or casing, a rotatable sleeve carried by said collar to receive one end of the tube to be cut, a shaft mounted for rotation in the tube or casing with a handle on one end and a spring arranged thereon between the end of the tube and the handle carried by the shaft, and a pair of cutters pivotally mounted in the other end of the shaft, said cutters crossing each other and having their free ends extending outwardly through slots provided therefor in the tube or casing and engaging with the interior of the tube to be cut, substantially as shown and described.

3. In a device of the character described, the combination with a casing, a spreader stationed in the end of the casing, an operating-shaft in the casing, cutting-fingers pivoted to the shaft, and means whereby the fingers are swung outward when pressed against the spreader.

4. In a device of the character described, the combination with a casing, a spreader being slotted to produce inclined sides, a shaft in the casing and fingers pivoted to the shaft and slidable on the inclined sides of the spreader.

In testimony whereof I affix my signature in the presence of two witnesses.

HARRY COOK.

Witnesses:
JOHN NOLAND,
H. C. EVERT.